(No Model.)
L. HOBLIT.
HORSE POWER HAY DERRICK.
No. 277,728. Patented May 15, 1883.
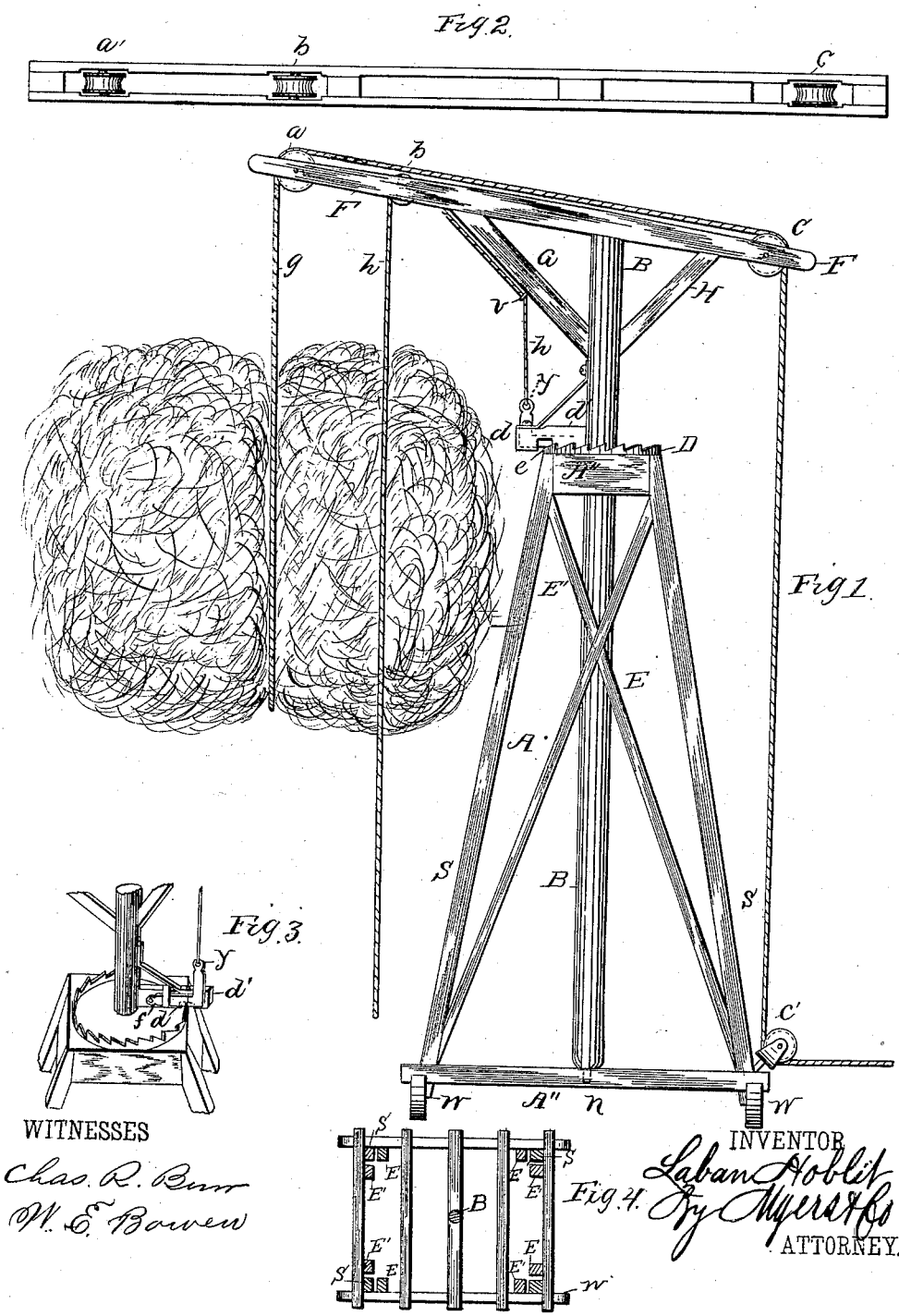
WITNESSES
Chas. R. Burr
W. E. Bowen
INVENTOR
Laban Hoblit
By Myers & Co
ATTORNEYS

UNITED STATES PATENT OFFICE.

LABAN HOBLIT, OF ATLANTA, ILLINOIS.

HORSE-POWER HAY-DERRICK.

SPECIFICATION forming part of Letters Patent No. 277,728, dated May 15, 1883.

Application filed January 26, 1883. (No model.)

*To all whom it may concern:*

Be it known that I, LABAN HOBLIT, a citizen of the United States of America, residing at Atlanta, in the county of Logan and State of Illinois, have invented certain new and useful Improvements in Horse-Power Hay-Derricks, of which the following is a specification, reference being had therein to the accompanying drawings.

My invention relates to an improvement in hay-derricks; and it consists in the derrick-frame A, hoisting-standard B, braces E, pulley-beam F, pulleys $a$ $b$ $c$, ratchet D, pawl or clutch $d$, cords $g$ and $h$, and in the combination and arrangement of the parts substantially as hereinafter more fully specified.

In the drawings, Figure 1 is a side elevation embodying my invention, and Figs. 2, 3, and 4 are detail views thereof.

A represents a derrick-frame of pyramidal shape, strengthened by the braces or crossbars E, the base A' and the platform A'' being rigidly secured to the standards S and resting upon the wheels W.

The hoisting-standard B is a vertical post, and has rigidly secured in the lower end thereof a journal-pin, $n$, which is adapted to rotate with the hoisting-standard, a suitable socket being provided in the center of the central transverse beam of platform A' for its reception.

The pulley-beam F is rigidly secured at a very slight angular elevation from front to rear on the hoisting-standard B, and braced thereto by the brace-bars G and H, and it furnishes bearings for the pulleys $a$, $b$, and $c$, which are located in the longitudinal recesses therein provided, as shown in Fig. 2.

The horizontal bar $d'$ is rigidly secured in a socket provided in the hoisting-standard B, and has formed therein the recess $e$, into which the teeth of the ratchet D slightly project, and to this bar is pivoted by the journal $f$ the right-angular pawl or clutch $d$, having eye Y for securing thereto rope $h$.

The bale or bundle of hay is secured at one end of the rope $g$, which in continuation rests upon and projects over pulleys $a$ and $c$ and under pulley C', and hence the bale may be readily lifted by horse or other power applied at the other end of the rope.

The bale is swung around to any point by use of the rope $h$, which is passed through the staple or eye $i$ and over the pulley $b$, and when the bale has reached its destination its further motion is instantly arrested by loosening the rope $h$, and thus lowering the pawl or clutch $d$, which falls between the teeth of the ratchet.

I am aware that cranes have been employed for elevating and moving hay; but

What I claim, and desire to secure by Letters Patent, is—

1. The combination of the derrick-frame A, hoisting-standard B, pivoted in platform A'', pulley-beam F, having pulleys $a$, $c$, and $b$, pulley C', and cords $g$ and $h$, substantially as shown, and for the purpose described.

2. The combination of the horizontal bar $d'$, standard B, journal $f$, clutch $d$, having eye Y, ratchet D, pulley $b$, and cord $h$, substantially as shown and described.

3. The combination of the pulley-beam F, having pulleys $a$, $b$, $c$, and adjustable on hoisting-standard B, ratchet D, pawl or clutch $d$, and cords $g$ and $h$, substantially as shown and described.

In testimony whereof I affix my signature in presence of two witnesses.

LABAN HOBLIT.

Witnesses:
N. N. DAVES,
A. C. MILLER.